(12) United States Patent
Hutton et al.

(10) Patent No.: US 6,381,390 B1
(45) Date of Patent: Apr. 30, 2002

(54) COLOR-CODED OPTICAL FIBER RIBBON AND DIE FOR MAKING THE SAME

(75) Inventors: Curtis J. Hutton; Patrick Bourghelle, both of Hickory; Houching Michael Yang; Robert W. Greer, IV, both of Conover; Mark Abee, Newton; Kevin Paschal, Claremont; Justin Thompson, Huntersville, all of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/287,017

(22) Filed: Apr. 6, 1999

(51) Int. Cl.$^7$ .................................................. G02B 6/44
(52) U.S. Cl. ....................................................... 385/114
(58) Field of Search ......................................... 385/114

(56) References Cited

U.S. PATENT DOCUMENTS

| | | |
|---|---|---|
| 4,147,407 A | 4/1979 | Eichenbaum et al. |
| 4,409,263 A | 10/1983 | Aloisio, Jr. et al. |
| 4,510,884 A | 4/1985 | Rosebrooks |
| 4,720,165 A | 1/1988 | Tokuda et al. |
| 4,900,126 A | 2/1990 | Jackson et al. |
| 5,062,685 A | 11/1991 | Cain et al. |
| 5,074,640 A | 12/1991 | Hardin et al. |
| 5,111,523 A | 5/1992 | Ferlier et al. |
| 5,151,306 A | 9/1992 | Andrews et al. |
| 5,208,889 A | 5/1993 | Cedrone et al. |
| 5,373,578 A | 12/1994 | Parker et al. |
| 5,377,292 A | 12/1994 | Bartline et al. |
| 5,446,821 A | 8/1995 | Nonaka et al. |
| 5,449,408 A | 9/1995 | Koaizawa et al. |
| 5,485,539 A | 1/1996 | Mills |
| 5,524,164 A | 6/1996 | Hattori et al. |
| 5,600,750 A | 2/1997 | Beasley, Jr. et al. |
| 5,761,363 A | 6/1998 | Mills |
| 5,796,905 A | 8/1998 | Hoffart et al. |
| 5,809,195 A | 9/1998 | Brown et al. |
| 6,064,789 A * | 5/2000 | Mills ........................ 385/114 |
| 6,208,790 B1 | 3/2001 | Zopf et al. |

FOREIGN PATENT DOCUMENTS

| | | |
|---|---|---|
| DE | 43 18 666 A1 | 12/1994 |
| DE | 4434 147 A1 | 3/1996 |
| EP | 0 270 854 | 9/1987 |
| EP | 0 390 415 | 10/1990 |
| FR | 2 613 981 | 4/1987 |
| WO | WO 93/25925 | 12/1993 |

OTHER PUBLICATIONS

"Optical Cables for Broadband Communication", Bonicel et al., Alcatel Telecommunications Review—3$^{rd}$ Quarter 1998, pp. 201–209.

"Analysis of the Economics of On–Line Colored Ribbon Manufacturing", Arvidsson, International Wire & Cable Symposium Proceedings, 1996, pp. 566–569.

"An Overview of Key Ribbon Handleability Attributes", Lochkovic et al., International Wire & Cable Symposium Proceedings 1997, pp. 260–271.

* cited by examiner

*Primary Examiner*—F L Evans
*Assistant Examiner*—Andrew H. Lee
(74) *Attorney, Agent, or Firm*—Sughrue Mion, PLLC

(57) ABSTRACT

A color-coded optical fiber ribbon includes a plurality of substantially parallel, adjacent, longitudinally extending optical fibers disposed, at least at a given cross section of the optical fiber ribbon, in substantially the same plane. A resin matrix material covers the optical fibers, which have at least one coating formed thereon. A color-coding identification scheme for the optical fiber ribbon is formed by coloring the optical fiber ribbon with at least two colors. A ribbon die for producing the color-coded optical fiber ribbon includes at least one coating chamber having at least one primary coating orifice for supplying a primary coating material to be applied to the optical fibers; and at least one flow guide channel for supplying a colored material in addition to the primary coating material in order to coat predetermined areas of the fiber optic ribbon so as to form the color-coding identification scheme.

37 Claims, 9 Drawing Sheets

FIG. 11(a)
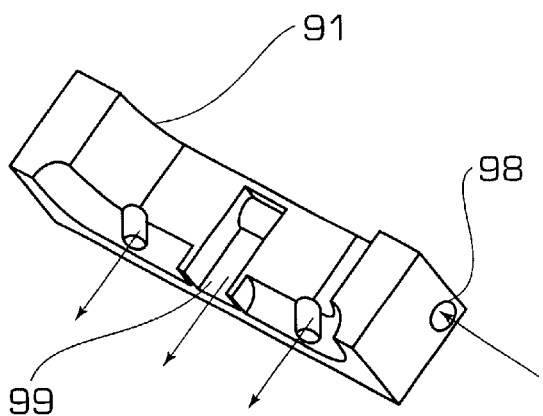
FIG. 11(b)
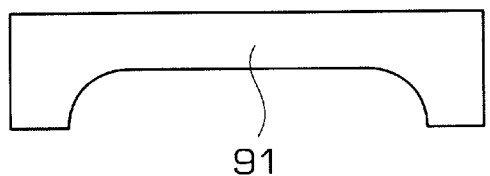
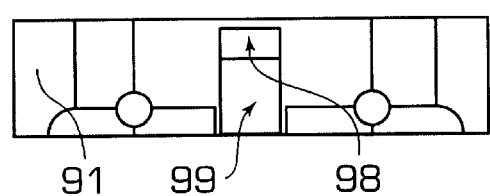
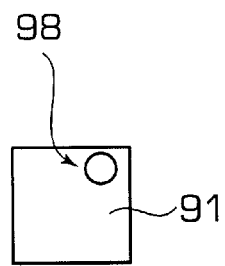
FIG. 11(c)             FIG. 11(d)

COLOR-CODED OPTICAL FIBER RIBBON AND DIE FOR MAKING THE SAME

BACKGROUND OF THE INVENTION

The present invention generally relates to optical fiber ribbons, and a die for making such ribbons. More specifically, the invention is directed to optical fiber ribbons that are color-coded for easy identification.

DESCRIPTION OF THE RELATED ART

Optical fiber ribbons consist of a planar array of optical fibers joined together by a resin matrix material or the like. Such ribbons are becoming increasingly popular where optical fibers are used for data transmission and the like. This is due, in part, to the fact that optical fiber ribbons may contain a relatively large number of optical fibers in a package that allows for easy handling and installation. Further, because optical fiber ribbons reduce the need for manipulating individual optical fibers, optical fiber maintenance procedures are simplified. Often, a single cable will include numerous optical fiber ribbons, stacked one on another or otherwise disposed in the cable.

It is desirable to be able to easily identify and distinguish optical fiber ribbons one from another and to distinguish constituent elements of a given optical fiber ribbon, both before and after the ribbons are installed in the field for use. Conventionally, ribbon identification has been accomplished by printing characters, such as words, on the ribbon surface using ink jet printing methods. Often, such printing is accomplished in a process separate from the process for manufacturing the ribbon itself. In such cases, this additional step requires that the ribbon be handled, thus subjecting it to the risk of damage. Moreover, a separate and distinct printing step is time consuming and expensive. In some cases, the printing step may be combined with the ribbon manufacturing process.

Regardless of whether an on-line or off-line printing step is used, once the identifying characters have been printed on the ribbon (using ink jet methods or the like), the printed characters are susceptible to smearing. Such smearing may render the printed characters illegible. Even when the characters are not smeared, their small size makes it very difficult to read them, particularly in the field where lighting conditions tend to be poor. Also, matching particular printed characters (e.g., particular languages) to particular markets and/or customers can be a difficult and expensive task.

It is also known in the art to color-code optical fibers for the purpose of positively identifying individual fibers. Conventionally, a thermosetting ink layer, a UV-cured ink or varnish layer, or the like, is coated on the fiber to give it a particular color (see, e.g., U.S. Pat. Nos. 5,446,821 and 5,377,292, the disclosures of which are incorporated herein by reference). Alternatively, pigments or dyes or any other coloring agents can be directly mixed into the material used to coat the fiber as it is drawn from an optical fiber preform. Such methods eliminate the additional step required to apply the ink or varnish layer. Moreover, it is known to combine the processes of fiber coloring with ribbon manufacturing (see, e.g., Analysis of the Economics of On-line Colored Ribbon Manufacturing, by B. Arvidsson and J.Tanskanen, International Wire & Cable Symposium Proceedings 1996, pp. 566–569, the subject matter of which is incorporated herein by reference).

SUMMARY OF THE INVENTION

In one aspect, the present invention relates to an optical fiber ribbon that includes a plurality of substantially parallel, adjacent, longitudinally extending optical fibers disposed in substantially the same plane; at least one coating on each of the plurality of optical fibers; and a resin matrix material covering the optical fibers, wherein a color-coding identification scheme for the optical fiber ribbon is formed by coloring the ribbon with at least two colors. The resin matrix material forms an outer surface of the optical fiber ribbon, the outer surface including a top surface, a bottom surface, a first hinge (or edge), and a second hinge. At least a portion of the top surface is a different color from at least a portion of the bottom surface, the first hinge, and/or the second hinge. Further, at least a portion of the top surface and/or the bottom surface may be transparent or translucent. The resin matrix material itself may be colored with two or more dyes and/or pigments to form the color-coding identification scheme.

In another aspect, the present invention relates to an optical fiber ribbon that includes a plurality of substantially parallel, adjacent, longitudinally extending optical fibers disposed in substantially the same plane; at least one coating on each of the plurality of optical fibers; a plurality of sub-units that include a subset of the plurality of optical fibers, each sub-unit covered by a sub-unit resin matrix material; and a common resin matrix material covering the plurality of sub-unit resin matrix materials and forming an outer surface of the optical fiber ribbon, wherein a color coding identification scheme for the optical fiber ribbon is formed by coloring the ribbon with at least two colors. For example, at least one of the sub-unit resin matrix material and the common resin matrix material may be dyed or pigmented with at least two colors. The common resin matrix material forms an outer surface of the optical fiber ribbon, the outer surface including a top surface, a bottom surface, a first hinge, and a second hinge. At least a portion of the, top surface is a different color from at least a portion of the bottom surface, the first hinge, and/or the second hinge. At least a portion of the top surface and/or the bottom surface may be transparent or translucent. Further, at least a portion of the sub-unit resin matrix material may be transparent or translucent.

In yet another aspect, the present invention relates to a ribbon die for producing color-coded optical fiber ribbons such as those mentioned above, the ribbon die including at least one coating chamber having at least one primary coating orifice for supplying a primary coating material to be applied to the optical fibers; and at least one flow guide channel for supplying a colored material in addition to the primary coating material in order to coat predetermined areas of the fiber optic ribbon so as to form the color-coding identification scheme. The die may also include at least one removable insert in which the flow guide channel is formed.

These and other aspects, features, and advantages of the present invention will become more apparent in light of the detailed description of the preferred embodiments of the invention set forth below, considered together with the accompanying drawings (the features of which are not necessarily drawn to scale). In this regard, it is noted that like reference numerals/characters are used to identify like elements throughout the disclosure.

BRIEF DESCRIPTION OF THE DRAWINGS

FIGS. 11(a)–(d) depict a second insert for the die depicted in FIG. 8;

DETAILED DESCRIPTION OF THE PREFERRED EMBODIMENTS

Figure 16:
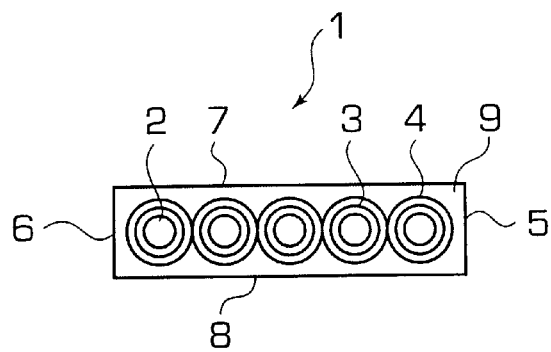
FIG. 16 depicts a conventional optical fiber ribbon.

FIG. 16 depicts a conventional optical fiber ribbon 1. The optical fiber ribbon 1 includes a plurality of optical fibers 2, each of which have, for example, a primary coating 3 and a secondary coating 4. The optical fibers 2 are covered by a common layer of material 9, such as a resin matrix material or the like. The common matrix layer 9 forms the first hinge (or edge) 5, the second hinge 6, the top surface 7, and the bottom surface 8 of the optical fiber ribbon 1. The outermost coatings of adjacent optical fibers 2 may contact each other, or there may be a gap, in which case the common matrix material 9 fills such gap. In this manner, the common matrix material holds the plurality of longitudinally extending optical fibers 2 so that they are substantially parallel, adjacent, and are disposed, at least at a given cross section of the optical fiber ribbon 1, in substantially the same plane. Typically, the primary coating 3 of the optical fiber 2 is made from a relatively low-modulus material, the secondary coating 4 of the optical fiber 2 is made from a relatively high-modulus material, and the common matrix material 9 may be made from an ultra-violet (UV) or electron-beam (EB) curable resin material, or from a thermoplastic material.

Figure 1:
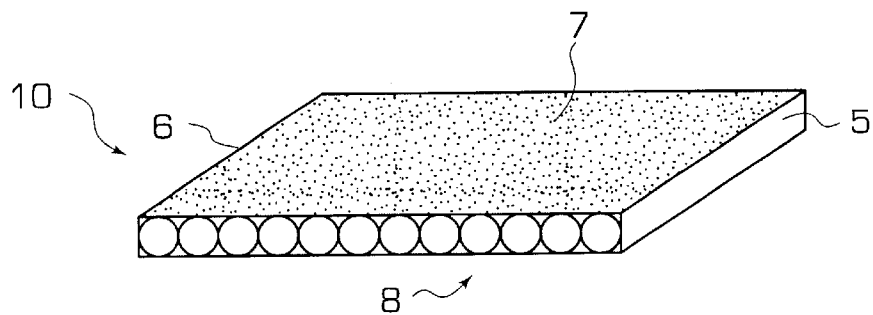
FIG. 1 depicts an optical fiber ribbon according to an embodiment of the present invention.

FIG. 1 depicts an embodiment of the present invention in which the top surface 7 of the optical fiber ribbon 10 is a different color than the bottom surface 8 of the ribbon. The ribbon may be colored in any number of different ways. In a preferred embodiment, the resin matrix material that is used to form the outer surface of the ribbon may be colored by directly mixing a pigmented material with the resin matrix material, or by use of an organic or inorganic dye in the matrix material. As one example, the pigmented material may be mixed with a clear resin matrix material. Alternatively, the pigmented material may be directly applied onto the ribbon 10. In these cases, a plurality of pigments and/or dyes is used to create the various and distinctly colored surfaces of the ribbons. Such application may be accomplished using a coating die, which is discussed in more detail below. As another example, a colored ink layer may be formed on the top and/or bottom surface of the ribbon 10 using an on-line or off-line process. Examples of such on-line or off-line processes include ink-jet printing, or printing using a printing wheel. Although the application of an ink layer to color-code the ribbon 10 is within the scope of the present invention, it may be less desirable than other alternatives. This is particularly true when an off-line printing step is used, as it requires an additional manufacturing step for the color-coded ribbon 10. Any desirable coloring method, of which the foregoing are merely examples, may be used to color-code the optical fiber ribbon 10 of this embodiment. This holds equally true for the following embodiments of the present invention.

Figure 2:
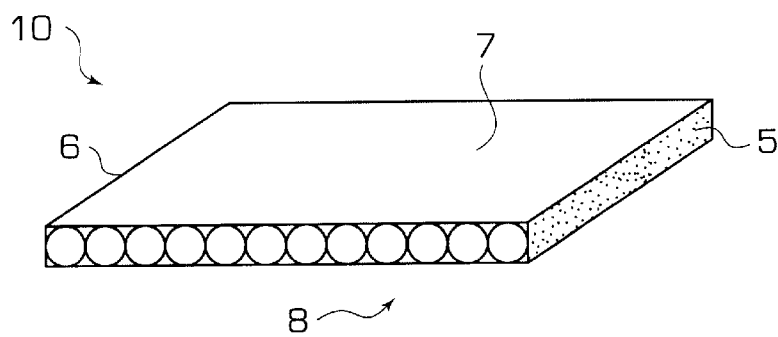
FIG. 2 depicts an optical fiber ribbon according to another embodiment of the present invention.

FIG. 2 depicts another embodiment of the present invention in which one or both hinges (or edges) 5, 6 of the ribbon 10 may be made a different color than the top surface 7 and/or the bottom surface 8 of the ribbon 10. One or both of the hinges 5, 6 may be colored using an on-line or off-line process. Because hinges of optical fiber ribbons tend to have a relatively small depth, coloring of the hinge is particularly effective for ribbon identification in applications where multiple ribbons are stacked on each other. When many ribbons are stacked together, the color or colors of the collective hinges, and patterns formed thereby, are readily discernible. Color-coding of one or both of the hinges 5, 6 may be combined with color-coding of one or both of the top and bottom surfaces 7, 8 of the ribbon 10, as desired. In this manner, ribbons may be identifiable even when viewing of the ribbon is possible only from the side, or from an oblique angle. In one example, one hinge may be made a different color from the other hinge to facilitate identification of a particular edge of the ribbon.

Figure 3:
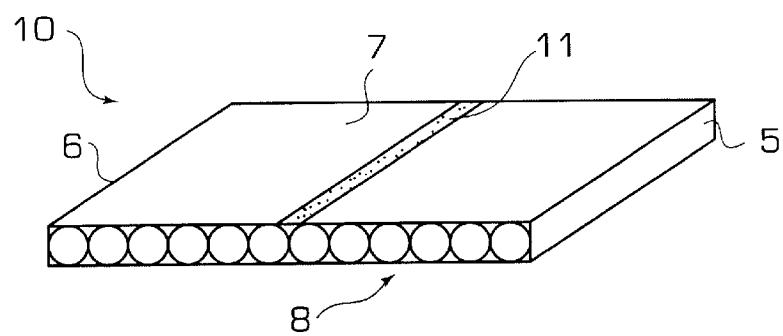
FIG. 3 depicts an optical fiber ribbon according to another embodiment of the present invention.

FIG. 3 depicts an embodiment of the present invention in which at least one colored-stripe 11 is formed on the top surface 7 and/or the bottom surface 8 of the color-coded optical fiber ribbon 10. The color of the stripe 11 may be any color, although it is preferable for it to contrast with the color of the surface on which it is formed. A plurality of stripes may be formed on the top surface 7 and/or the bottom surface 8 of the color-coded optical fiber ribbon 10, as desired. Such stripes may be the same or different colors, as desired. The stripes (or other markings) may have the same width, different relative widths, varying widths along their length, etc. Moreover, a particular stripe, which may be continuous or intermittent, may have varying or different colors at different points along its length.

Figure 4:
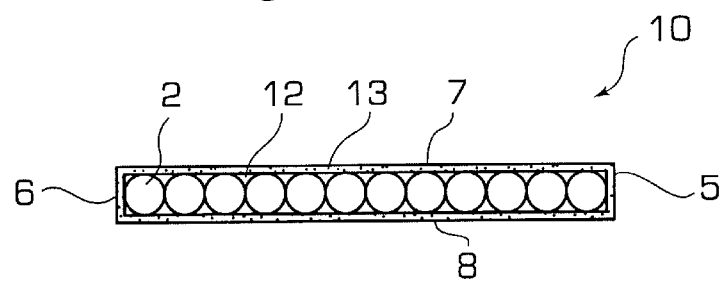
FIG. 4 depicts an optical fiber ribbon according to another embodiment of the present invention.

FIG. 4 depicts a dual-layered matrix design for the color-coded ribbon 10 of the present invention. In this embodiment, a first layer of resin matrix material 12 covers the coated optical fibers 2 of the optical fiber ribbon 10. Encasing the first layer of resin matrix material 12 is a second layer of resin matrix material 13, which forms the outer surface of the optical fiber ribbon 10. In this embodiment, the second layer of resin matrix material 13 may be colored-coded as in any of the embodiments described above. Further, at least a portion of the second layer of resin matrix material 13 may be formed of a transparent and/or translucent material. The first layer of resin matrix material 12 may also be color-coded as in any of the embodiments described above. Such color-coding would e visible through the transparent/translucent portion of the second layer of resin matrix material 13. Also, at least a portion of both the first layer of resin matrix material 12 and the second layer of resin matrix material 13 may be formed of a transparent and/or translucent material. In this case, the coated optical fibers 2, which may be color-coded themselves, may be visible through the transparent/translucent portions.

Figure 5:
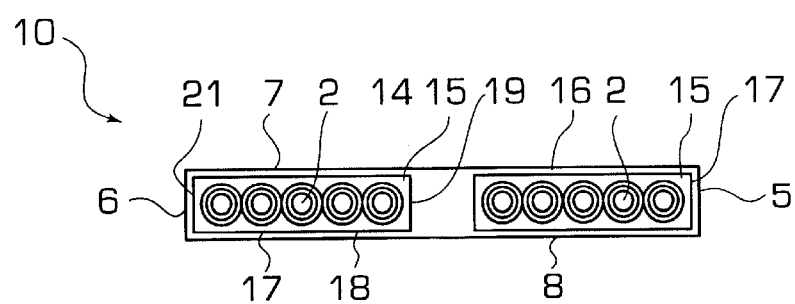
FIG. 5 depicts an optical fiber ribbon according to another embodiment of the present invention.

In FIG. 5, another embodiment of the present invention is depicted in which the optical fiber ribbon 10 includes sub-units 17 that contain a subset of the total number of optical fibers 2 contained in the ribbon 10. These subsets of optical fibers are respectively encased in a sub-unit resin matrix material 15, which itself comprises a sub-unit top surface 14, a sub-unit bottom surface 18, a sub-unit first hinge 19, and a sub-unit second hinge 21. A common resin matrix material 16 surrounds all of the sub-unit resin matrix material 15, so as to form the outer surface of the optical fiber ribbon 10. One example of such an optical fiber ribbon is a splittable ribbon, in which the common resin matrix material 16 may be ruptured to provide access to the intact sub-units 17.

Any combination of the color-coding schemes set forth above may be used in this embodiment of the present invention. For example, the common resin matrix material 16 may be color-coded with contrasting colors, stripes, or other identifying or distinguishing scheme(s). Further, at least a portion of the common resin matrix material 16 may be formed of a transparent and/or translucent material. Further still, any one or number of the sub-unit resin matrix materials 15 may be color-coded as in any of the embodiments described above. Also, at least a portion of both the common resin matrix material 16 and the sub-unit resin matrix materials 15 may be formed of a transparent and/or translucent material. In this case the optical fibers 2, which may be color-coded themselves, may be visible through the transparent/translucent portions.

The embodiment of the present invention depicted in FIG. 5 may also be color-coded in a manner such that the common resin matrix material is a first color, while one or both sub-units 17 are formed with a resin matrix material 16 that is a different color from that of the common resin matrix material 16. Moreover, this basic color-coding scheme could be supplemented with any of the additional color-coding schemes described above, as desired. In this manner, particular optical fibers in a particular sub-unit may be identified by reference to their unique color-coding. For example, one may refer to a particular optical fiber as the red optical fiber in the yellow sub-unit of the blue ribbon, as distinguished from the red optical fiber in the white sub-unit of the blue ribbon.

Figure 6:
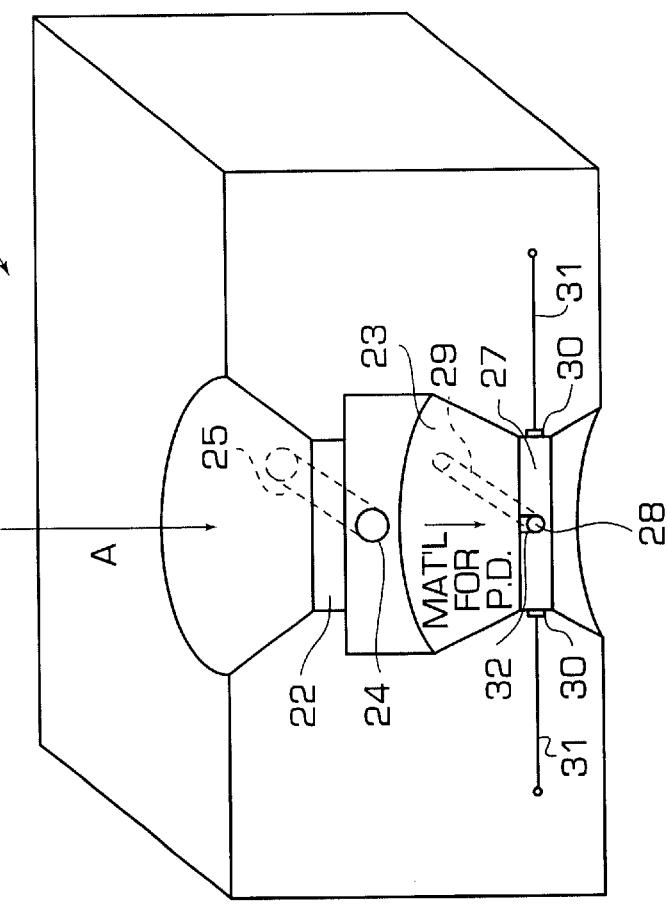
FIG. 6 depicts a view of a portion of a die for producing an optical fiber ribbon according to the present invention.

A portion of a die 20 for producing an optical fiber ribbon according to the present invention is depicted in FIG. 6. It will be understood that only one half of the die is depicted in FIG. 6, and that the remaining half is basically a mirror image of the portion depicted. Of course, details of the remaining half of the die may be slightly different (such as particular orifices and passageways, if any) so as to achieve a particular pattern (location, shape, size, etc.) of the applied resin matrix material to thereby control the color-coding of the ribbon, as desired.

The fibers comprising the ribbon (or a ribbon sub-unit) enter the die 20 in the direction of arrow A. The fibers are threaded through the die so as to pass through the alignment land 22. The alignment land 22 roughly (or finely) aligns the fibers or ribbon sub-units while guiding them into the first coating chamber 23. Resin matrix (or other suitable) material is supplied to the first coating chamber 23 through an orifice or outlet 24, which is fed by passageway 25. The resin-coated fibers then enter the forming land 27 of the die 20. The forming land 27 may have one or more orifices for supplying additional resin matrix material to the ribbon passing through the die 20. For example, an orifice 28, which is supplied with colored resin matrix (or other) material via the passageway 29, may be used to create a striped pattern on the ribbon.

As stated above, the color of the resin matrix material deposited on the ribbon through the orifice 28 will be visually distinguishable from the resin matrix material supplied through the orifice 24. As will be understood, by modifying the placement, size, etc. of the orifice 28, the characteristics of the stripe or other (perhaps intermittent) pattern may be varied, as desired. If it is desirable to make one or both hinges of the ribbon a different color than the other surfaces of the ribbon, additional orifices 30 may be formed in the die 20. These orifices 30 are fed colored resin matrix (or other) material via passageways 31.

Figure 7:
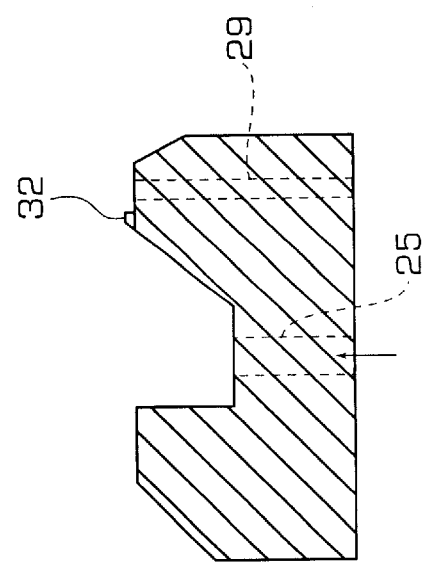
FIG. 7 depicts a sectional view of the die depicted in FIG. 6.

It has been found that successful application of the resin matrix (or other) material by orifice 28, orifices 30, or the like, may be achieved by forming a projection 32 in the upstream direction of ribbon travel relative to that orifice (FIG. 7). The projection 32 is preferably formed from stainless steel, tool steel, or their alloys (e.g., CPM 10V®, manufactured by Crucible Materials Corporation), but may be formed of any suitable material (e.g., any other suitable metal or plastic material). The projection 32 is believed to create a favorable pressure differential that facilitates deposition of the matrix material from the given orifice. Although for the sake of simplicity a projection 32 is depicted only for the orifice 28, it is understood that all orifices may have such a projection.

Figure 8:
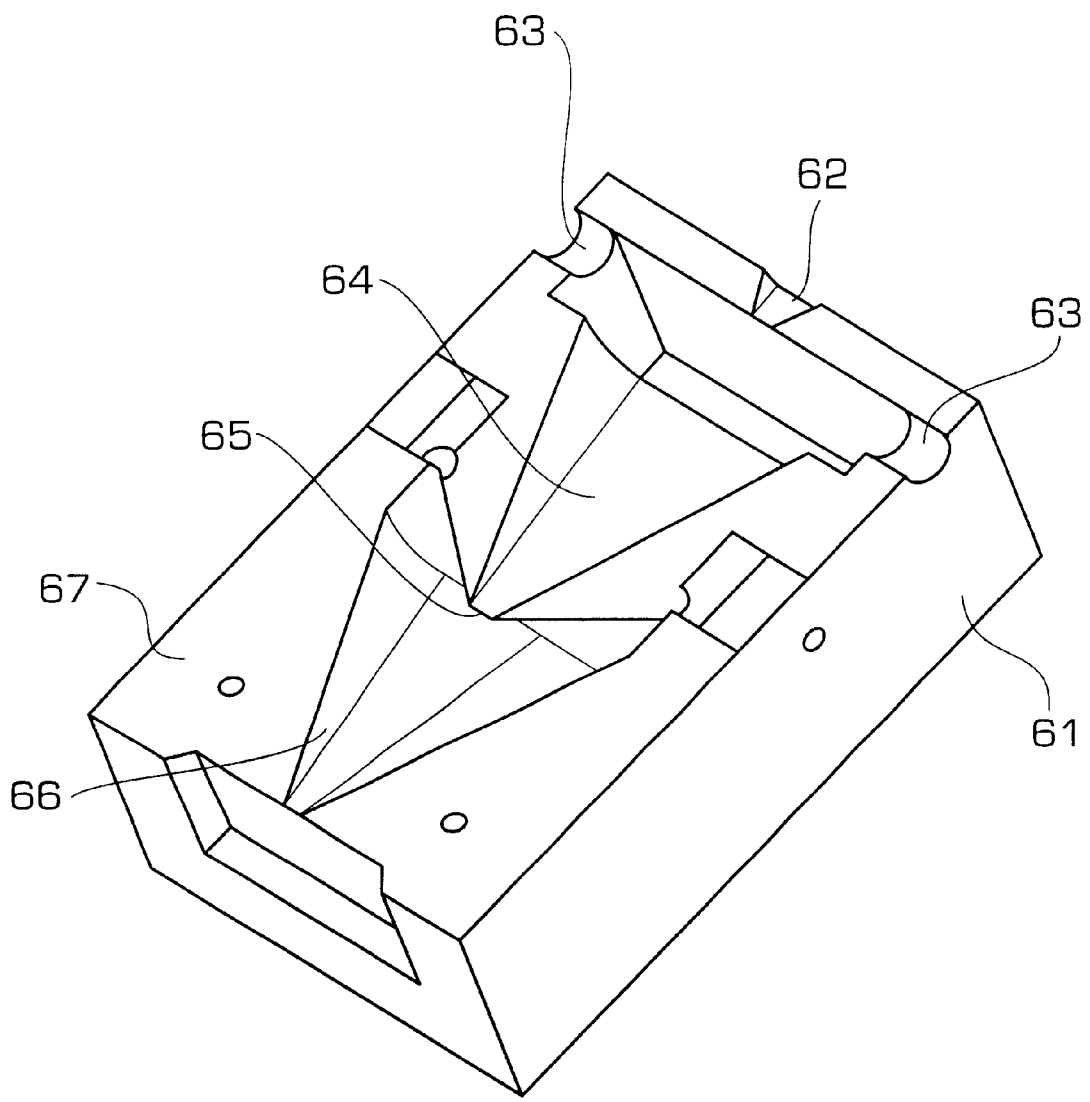
FIG. 8 depicts a view of a portion of another die for producing an optical fiber ribbon according to the present invention.
Figure 9:
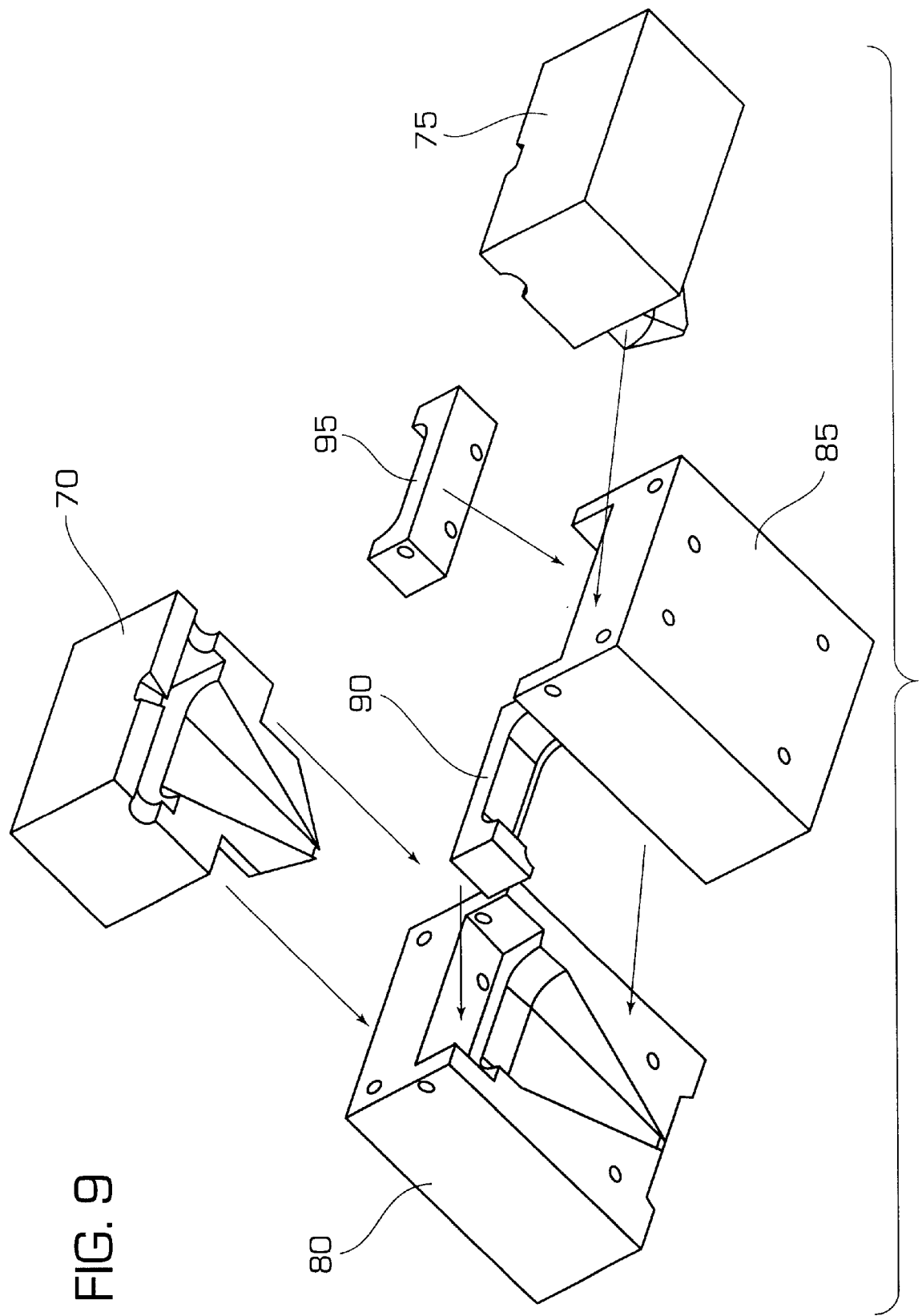
FIG. 9 depicts an exploded view of the die depicted in FIG. 8.
Figure 10A:
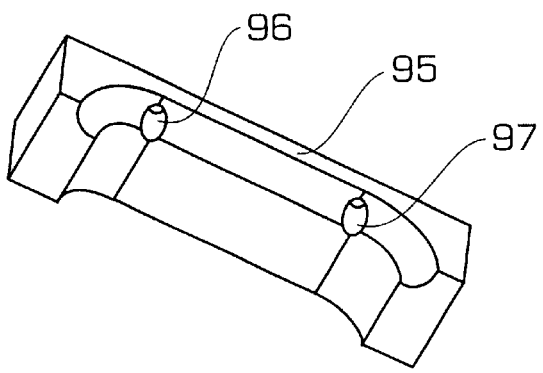
FIGS. 10(a)–(d) depict a first insert for the die depicted in FIG. 8.
Figure 10B:
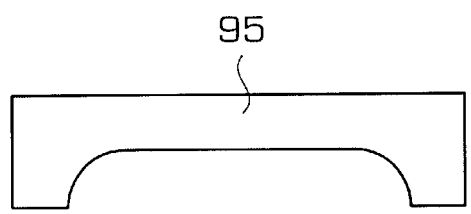
Figure 10C:
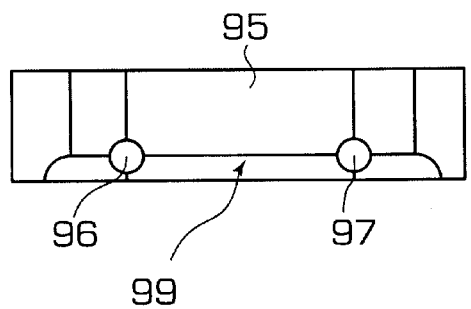
Figure 10D:
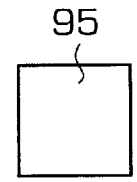
Figure 12A:
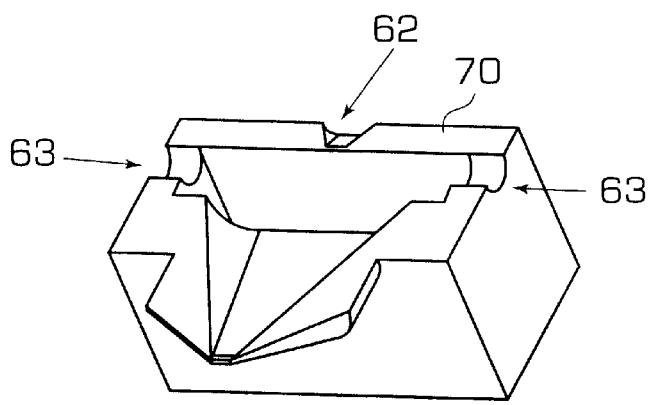
FIGS. 12(a)–(d) depict the top portion of the die depicted in FIG. 8.
Figure 12B:
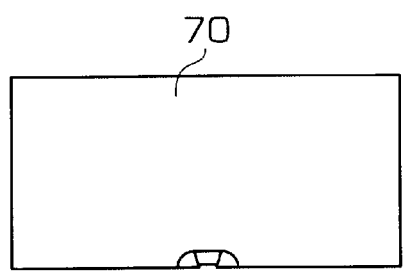
Figure 12C:
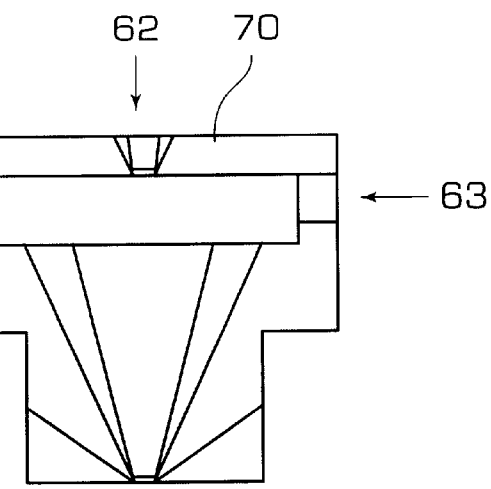
Figure 12D:
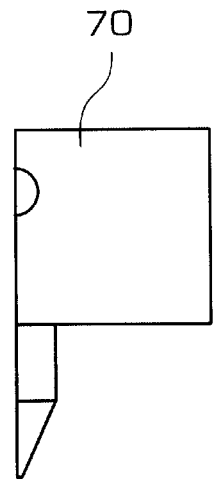
Figure 13A:
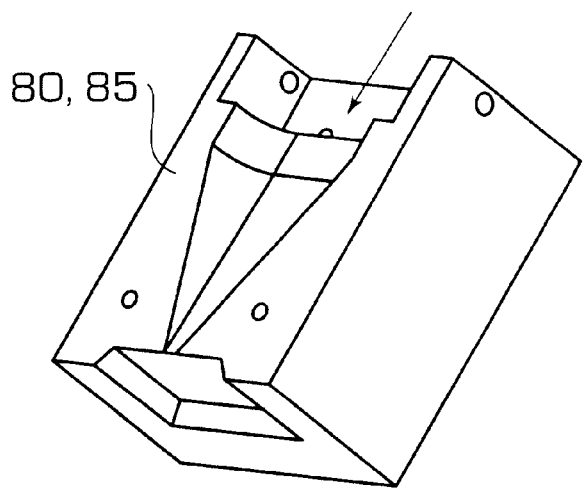
FIGS. 13(a)–(d) depict the bottom portion of the die depicted in FIG. 8.
Figure 13B:
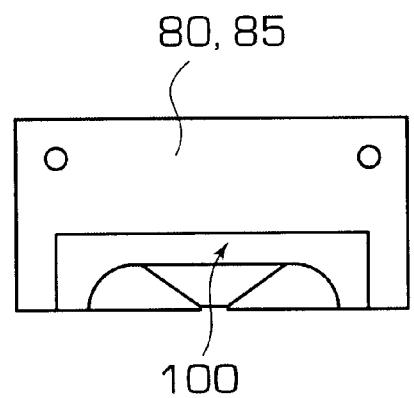
Figure 13C:
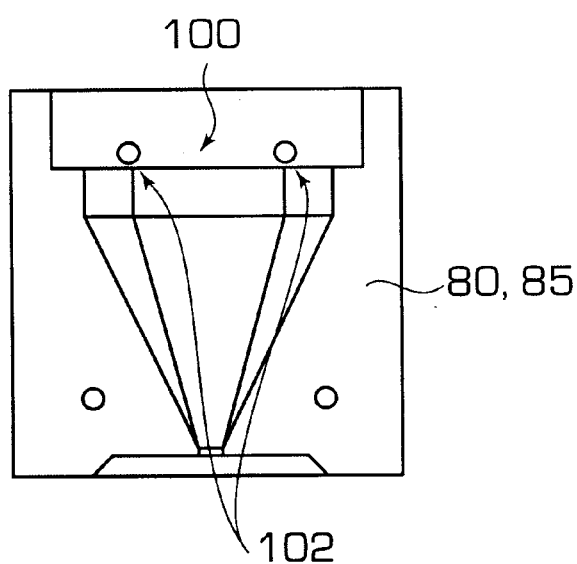
Figure 13D:
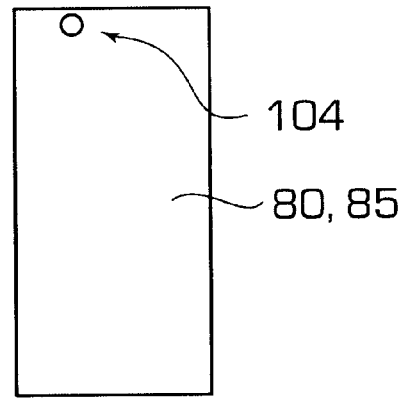

Another die 60 for producing an optical fiber ribbon according to the present invention is depicted in FIGS. 8 and 9. As depicted in these figures, the die 60 includes a first top quarter 70 (FIGS. 12(*a*)–12(*d*)) and a second top quarter 75 (which is basically a mirror image of the first top quarter 70), which together form the top portion 61 of the die 60. The die 60 further includes a first bottom quarter 80 and a second bottom quarter 85 (which is basically a mirror image of the first bottom quarter 80- FIGS. 13(*a*)–13(*d*)), which together form the bottom portion 67 of the die 60. Removable inserts 90 and 95 are designed to respectively fit into the first bottom quarter 80 and second bottom quarter 85 of the die 60. As will be understood, at least the external dimensions of the removable insert 90 are basically a mirror image of those of the removable insert 95 (shown in FIGS. 10(*a*)–10(*d*)).

As shown in FIG. 8, the top portion 61 has a fiber inlet 62. Orifices 63 are provided for feeding a primary resin matrix (or other suitable) material into a first coating chamber 64. The alignment land 65 of the first coating chamber 64 roughly (or finely) aligns the fibers or ribbon sub-units while guiding them into the second coating chamber 66 of the bottom portion 67 of the die 60. Secondary resin matrix (or other suitable) material is supplied into the second coating chamber 66 via the removable inserts 90 and 95 through orifices 96 and 97 formed therein (FIG. 10(*a*)).

The removable inserts 90 and 95 are designed to be interchangeable with other removable inserts so that various types of ribbons may be produced with a single die 60. For example, using the particular removable insert 91 depicted in FIGS. 11(*a*)–(*d*), the ribbon may be made to have a striped or other pattern. This is accomplished by utilizing a material flow guide channel 99 through which a resin matrix (or other suitable) material is supplied to a particular portion of the second coating chamber 66 via the orifice 98. The resin matrix (or other suitable) material used to create the striped or other pattern is visually distinguishable from the secondary resin matrix material being applied in the secondary coating chamber 66. In contrast, a removable insert such as removable insert 95 would be used to apply a single matrix material of a single color to an entire side of the ribbon being formed. Details of the configuration of a particular removable insert (such as particular orifices and passageways, if any) may be controlled so as to achieve a particular location, shape, size, etc. of the pattern of the applied resin matrix material to thereby control the color-coding scheme of the ribbon, as desired. As shown in FIGS. 13(*a*)–(*d*), the bottom quarters 80, 85 have a flow insert guide seat 100, a base color material supply port 102 and a striping material supply port 104.

Regarding the color-coding scheme of the ribbon, the resin matrix material used to create the striped or other pattern may be a different color from the secondary resin matrix material, or may be visually distinguishable under ultraviolet or infrared radiation or the like. The size, shape, and/or location of the orifice 98 of removable insert 91 may be configured in any desired manner so as to achieve the desired identifying pattern on the ribbon. Because the inserts are removable and interchangeable, a single dual-chambered coating die may be used to create a variety of identifying marks on optical fiber ribbons produced therewith. As with the die 20 discussed above, a projection may be formed for a given outlet of resin matrix (or other suitable) material in the upstream direction of ribbon travel relative to that outlet in order to facilitate deposition of the resin matrix (or other suitable) material onto the ribbon from that particular orifice.

Figure 14:
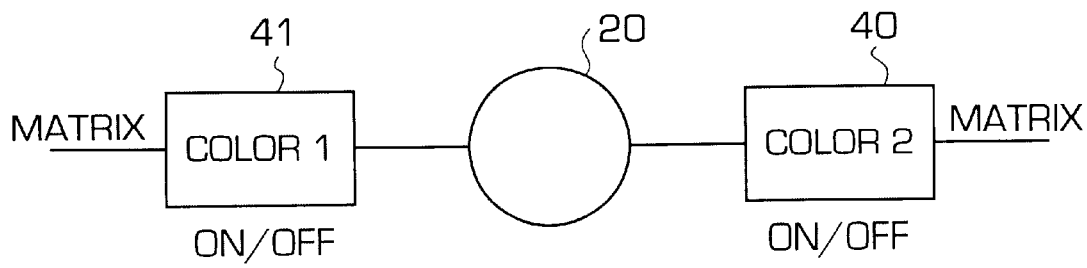
FIG. 14 depicts a schematic view of one embodiment of a coating apparatus to produce an optical fiber ribbon according to the present invention.
Figure 15:
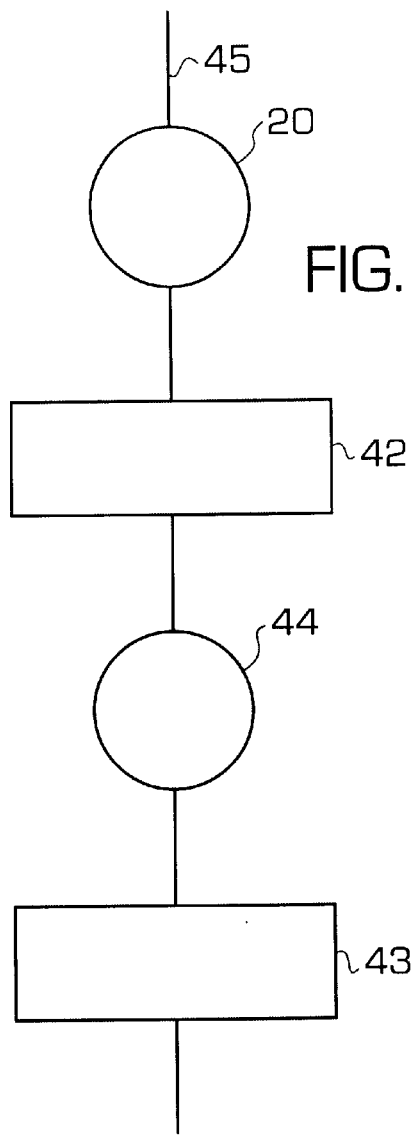
FIG. 15 depicts a schematic view of another embodiment of a coating apparatus to produce an optical fiber ribbon according to the present invention.

FIGS. 14 and 15 schematically depict a system for producing ribbons according to the present invention. In FIG. 14, colored resin matrix (or other) material 40, 41 is fed from reservoirs into the coating die 20. Although two such reservoirs are depicted, any desirable number may be chosen with any desired variety of colors and/or materials. As depicted in FIG. 15, the fiber/ribbon 45 is fed into the first coating die 20 for applying a resin matrix after which it enters a UV light source (or other appropriate source) 42 for curing or drying the material applied in the coating die 20. If desired, the fiber/ribbon 45 may then be fed into a second die which is an ink applicator 44. Any applied ink may be cured or dried by UV light source (or other appropriate source) 43. FIGS. 14 and 15 are presented only by way of example, and are not intended to limit the claimed invention. In fact, optical fiber ribbon production itself is well known in the art, as demonstrated by U.S. Pat. No. 5,524,164, which is incorporated herein by reference.

It will be appreciated that although particular coloring schemes are described herein, these are presented by way of example, and the invention should not be so limited. Moreover, particular features of a given embodiment set forth above may be freely combined with particular features of another embodiment, as desired. Further, "two colors", "different colors", or "contrasting colors" is understood to include different colors entirely, different shades of the same color, or any other formulation that allows for visually distinguishing and/or identifying ribbons (or constituent parts thereof) on the basis of color. Also included within the scope of the present invention is the use of fluorescent or reflective materials (or other such materials) that facilitate the ability to distinguish between colors. These materials include those that exhibit visual colors or contrasting marks when illuminated by ultraviolet, infrared, other radiation, or the like.

Further, the present invention is not limited to the particular ribbons disclosed herein as illustrative examples, but, instead, applies equally to other ribbon designs. For example, the ribbons disclosed herein contain eight optical fibers, but any desired number of optical fibers may be included within the spirit and scope of the present invention. Moreover, the ribbons may have any desirable structural configuration as long as they utilize an identification scheme that includes at least two contrasting colors.

While the present invention has been described with respect to what is presently considered to be the preferred embodiments, the present invention is not limited to the disclosed embodiments. Rather the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. An optical fiber ribbon comprising:
   a plurality of substantially parallel, adjacent, longitudinally extending optical fibers disposed, at least at a given cross section of said optical ribbon, in substantially the same plane;
   at least one coating on each of said plurality of optical fibers; and
   a resin matrix material covering said optical fibers,
   wherein said resin matrix material is of at least two colors to provide a color-coding identification scheme for said optical fibers.

2. An optical fiber ribbon according to claim 1, wherein said resin matrix material forms an outer surface of said optical fiber ribbon, said outer surface including a top surface, a bottom surface, a first hinge, and a second hinge, and wherein at least a portion of said top surface is a different color from at least a portion of at least one of said bottom surface, said first hinge, and said second hinge.

3. An optical fiber ribbon according to claim 2, wherein a longitudinal pattern is formed on at least one of said top surface and said bottom surface, said longitudinal pattern being a different color than the color of the surface on which it is formed.

4. An optical fiber ribbon according to claim 3, wherein said longitudinal pattern is one of a continuous stripe and an intermittent stripe.

5. An optical fiber ribbon according to claim 3, wherein at least one of said first hinge and said second hinge is a different color from at least a portion of one of said top surface and said bottom surface.

6. An optical fiber ribbon according to claim 2, wherein at least one of said first hinge and said second hinge is a different color from at least one of said top surface and said bottom surface.

7. An optical fiber ribbon according to claim 1, wherein said resin matrix material forms an outer surface of said optical fiber ribbon, said outer surface including a top surface, a bottom surface, a first hinge, and a second hinge, and wherein at least a portion of one of said top surface and said bottom surface is one of transparent and translucent.

8. An optical fiber ribbon according to claim 7, wherein at least one of said first hinge and said second hinge is a different color from at least one of said top surface and said bottom surface.

9. An optical fiber ribbon according to claim 7, wherein said at least one coating on each of said plurality of optical fibers is color-coded.

10. An optical fiber ribbon according to claim 7, wherein a longitudinal pattern is formed on at least one of said top surface and said bottom surface, said longitudinal pattern being a different color than the color of the surface on which it is formed.

11. An optical fiber ribbon comprising:
a plurality of substantially parallel, adjacent, longitudinally extending optical fibers disposed, at least at a given cross section of said optical ribbon, in substantially the same plane;
at least one coating on each of said plurality of optical fibers;
a plurality of sub-units that include a subset of said plurality of optical fibers, each sub-unit covered by a sub unit resin matrix material; and
a common resin matrix material surrounding said plurality of sub-unit resin matrix materials and forming an outer surface of said optical fiber ribbon,
wherein said sub-resin matrix material and said common resin matrix material are of at least two colors to provide a color-coding identification scheme for said optical fiber ribbon.

12. An optical fiber ribbon according to claim 11, wherein said outer surface of said optical fiber ribbon includes a top surface, a bottom surface, a first hinge, and a second hinge, and wherein at least a portion of said top surface is a different color from at least a portion of at least one of said bottom surface, said first hinge, and said second hinge.

13. An optical fiber ribbon according to claim 12, wherein a longitudinal pattern is formed on at least one of said top surface and said bottom surface, said longitudinal pattern being a different color than the color of the surface on which it is formed.

14. An optical fiber ribbon according to claim 13, wherein said longitudinal pattern is a continuous stripe.

15. An optical fiber ribbon according to claim 13, wherein at least one of said first hinge and said second hinge is a different color from at least one of said top surface and said bottom surface.

16. An optical fiber ribbon according to claim 12, wherein at least one of said first hinge and said second hinge is a different color from at least one of said top surface and said bottom surface.

17. An optical fiber ribbon according to claim 11, wherein said resin matrix material forms an outer surface of said optical fiber ribbon, said outer surface including a top surface, a bottom surface, a first hinge, and a second hinge, and wherein at least a portion of one of said top surface and said bottom surface is one of transparent and translucent.

18. An optical fiber ribbon according to claim 17, wherein said sub-unit resin matrix material includes a sub-unit top surface, a sub-unit bottom surface, a sub-unit first hinge, and a sub-unit second hinge, and wherein at least a portion of at least one of said sub-unit top surface and said sub-unit bottom surface is viewable through said at least a portion of one of said top surface and said bottom surface of said outer surface of said optical fiber ribbon that is one of transparent and translucent.

19. An optical fiber ribbon according to claim 18, wherein said viewable portion of said sub-unit resin matrix material is color-coded.

20. An optical fiber ribbon according to claim 18, wherein at least a portion of said viewable portion of said sub-unit resin matrix material is one of transparent and translucent.

21. An optical fiber ribbon according to claim 20, wherein said at least one coating on each of said plurality of optical fibers is color-coded.

22. An optical fiber ribbon according to claim 18, wherein at least one of said first hinge and said second hinge is a different color from at least one of said top surface and said bottom surface.

23. An optical fiber ribbon according to claim 18, wherein a longitudinal pattern is formed on at least one of said top surface and said bottom surface, said longitudinal pattern being a different color than the color of the surface on which it is formed.

24. An optical fiber ribbon according to claim 17, wherein at least one of said first hinge and said second hinge is a different color from at least one of said top surface and said bottom surface.

25. An optical fiber ribbon according to claim 17, wherein a longitudinal pattern is formed on at least one of said top surface and said bottom surface, said longitudinal pattern being a different color than the color of the surface on which it is formed.

26. An optical fiber ribbon according to claim 11, wherein said sub-unit resin matrix material is a first color, and said common resin matrix material is a second color different from said first color.

27. An optical fiber ribbon comprising:
a plurality of substantially parallel, adjacent, longitudinally extending optical fibers disposed, at least at a given cross section of said optical ribbon, in substantially the same plane;
at least one coating on each of said plurality of optical fibers; and
a resin matrix material covering said optical fiber ribbon,
wherein said optical fiber ribbon is of at least two colors to provide a color-coding identification scheme for said optical fiber ribbon.

28. An optical fiber ribbon according to claim 27, wherein said resin matrix material forms an outer surface of said optical fiber ribbon, said outer surface including a top surface, a bottom surface, a first hinge, and a second hinge, and wherein at least a portion of said top surface is a different color from at least a portion of at least one of said bottom surface, said first hinge, and said second hinge.

29. An optical fiber ribbon according to claim 28, wherein a longitudinal pattern is formed on at least one of said top surface and said bottom surface, said longitudinal pattern being a different color than the color of the surface on which it is formed.

30. An optical fiber ribbon according to claim 29, wherein said longitudinal pattern is one of a continuous stripe and an intermittent stripe.

31. An optical fiber ribbon according to claim 29, wherein at least one of said first hinge and said second hinge is a different color from at least a portion of one of said top surface and said bottom surface.

32. An optical fiber ribbon according to claim 28, wherein at least one of said first hinge and said second hinge is a different color from at least one of said top surface and said bottom surface.

33. An optical fiber ribbon according to claim 27, wherein said resin matrix material forms an outer surface of said optical fiber ribbon, said outer surface including a top surface, a bottom surface, a first hinge, and a second hinge, and wherein at least a portion of one of said top surface and said bottom surface is one of transparent and translucent.

34. An optical fiber ribbon according to claim 33, wherein at least one of said first hinge and said second hinge is a different color from at least one of said top surface and said bottom surface.

35. An optical fiber ribbon according to claim 33, wherein said at least one coating on each of said plurality of optical fibers is color-coded.

36. An optical fiber ribbon according to claim 33, wherein a longitudinal pattern is formed on at least one of said top surface and said bottom surface, said longitudinal pattern being a different color than the color of the surface on which it is formed.

37. An optical fiber ribbon comprising:

a plurality of substantially parallel, adjacent, longitudinally extending optical fibers disposed, at least at a given cross section of said optical ribbon, in substantially the same plane;

at least one coating on each of said plurality of optical fibers;

a plurality of sub-units that include a subset of said plurality of optical fibers, each sub-unit covered by a sub unit resin matrix material; and a common resin matrix material covering said plurality of sub-unit resin matrix materials and forming an outer surface of said optical fiber ribbon, wherein said optical fiber is ribbon of at least two colors to provide a color-coding identification scheme for said optical fiber ribbon.

* * * * *